US008176356B2

(12) United States Patent
Tashiro et al.

(10) Patent No.: US 8,176,356 B2
(45) Date of Patent: May 8, 2012

(54) MEDICAL-INFORMATION COMMUNICATION-CONNECTION MANAGEMENT DEVICE AND A METHOD OF MANAGING A MEDICAL-INFORMATION COMMUNICATION CONNECTION

(75) Inventors: Junichi Tashiro, Otawara (JP); Shinya Sugiyama, Nasushiobara (JP); Kousuke Sakaue, Nasushiobara (JP)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 0 days.

(21) Appl. No.: 12/698,623

(22) Filed: Feb. 2, 2010

(65) Prior Publication Data

US 2010/0205485 A1 Aug. 12, 2010

(30) Foreign Application Priority Data

Feb. 6, 2009 (JP) ................. 2009-025965

(51) Int. Cl.
*G06F 11/00* (2006.01)
(52) U.S. Cl. ...................................... 714/4.1
(58) Field of Classification Search ............ 714/4.1
See application file for complete search history.

(56) References Cited

U.S. PATENT DOCUMENTS

| | | | | |
|---|---|---|---|---|
| 5,668,998 | A * | 9/1997 | Mason et al. ................. | 717/104 |
| 6,388,687 | B1 * | 5/2002 | Brackett et al. .............. | 715/810 |
| 6,494,831 | B1 * | 12/2002 | Koritzinsky .................. | 600/301 |
| 7,554,983 | B1 * | 6/2009 | Muppala ....................... | 370/392 |
| 2005/0262200 | A1 * | 11/2005 | Moritzen ...................... | 709/204 |
| 2006/0164999 | A1 * | 7/2006 | Yamamoto et al. ........... | 370/241 |
| 2006/0235716 | A1 * | 10/2006 | Mahesh et al. ..................... | 705/1 |
| 2006/0242094 | A1 * | 10/2006 | Tamakoshi ...................... | 706/23 |
| 2007/0043535 | A1 * | 2/2007 | Belden .......................... | 702/183 |
| 2007/0053567 | A1 * | 3/2007 | Adachi et al. ................. | 382/128 |
| 2007/0058847 | A1 * | 3/2007 | Gibbs et al. .................... | 382/128 |
| 2007/0109961 | A1 * | 5/2007 | Liang ............................ | 370/229 |
| 2007/0118635 | A1 * | 5/2007 | Nakano ......................... | 709/223 |
| 2009/0125816 | A1 * | 5/2009 | Amon ........................... | 715/748 |
| 2009/0164253 | A1 * | 6/2009 | Lyshkow ........................ | 705/3 |
| 2009/0323718 | A1 * | 12/2009 | Oren-Dahan ................. | 370/466 |
| 2010/0023981 | A1 * | 1/2010 | Creamer et al. .............. | 725/105 |

FOREIGN PATENT DOCUMENTS

| | | |
|---|---|---|
| JP | 2002-259242 | 9/2002 |
| JP | 2005-198776 | 7/2005 |
| JP | 2006-110007 | 4/2006 |

* cited by examiner

*Primary Examiner* — Robert Beausoliel, Jr.
*Assistant Examiner* — Neil Miles
(74) *Attorney, Agent, or Firm* — Oblon, Spivak, McClelland, Maier & Neustadt, L.L.P.

(57) ABSTRACT

A medical-information communication-connection management device including a request sending part that sends connection requests during network communication and DICOM communication to a medical information device, a response-data receiving part that receives response data for each connection request, a first response analyzing part that receives the response data and analyzes any error in the network communication to acquire first error information, a second response analyzing part that analyzes any error in the DICOM communication during a failed connection to acquire second error information, and a display controller that displays countermeasures on a display part.

10 Claims, 10 Drawing Sheets

FIG. 2A

| STORAGE SERVICE ||
|---|---|
| DEFAULT COMPRESSION TYPE | ✓ NOCOMPRESSION |
| COMPRESSION TYPE(S) SUPPORTED | ✓ JPEG LOSSY<br>✓ JPEG LOSSLESS<br>✓ RLE |

| IMAGE DATA TYPE SETTING |||
|---|---|---|
| IMAGE DATA TYPE | SENDSTATUS | COMPRESSION TYPE |
| DEFAULT | Y | ✓ NOCOMPRESSION<br>✓ JPEG LOSSY<br>✓ JPEG LOSSLESS<br>✓ RLE |
| USIMAGE | N | ✓ NOCOMPRESSION<br>✓ JPEG LOSSY<br>✓ JPEG LOSSLESS<br>✓ RLE |
| CTIMAGE | Y | ✓ NOCOMPRESSION<br>✓ JPEG LOSSY<br>✓ JPEG LOSSLESS<br>✓ RLE |
| MRIMAGE | Y | ✓ NOCOMPRESSION<br>✓ JPEG LOSSY<br>✓ JPEG LOSSLESS<br>✓ RLE |

FIG. 2B

| STORAGE SERVICE | |
|---|---|
| DEFAULT COMPRESSION TYPE | ✓ NOCOMPRESSION |
| COMPRESSION TYPE(S) SUPPORTED | ✓ JPEG LOSSY<br>✓ JPEG LOSSLESS<br>✓ RLE |
| IMAGE DATA TYPE SETTING | |

| IMAGE DATA TYPE | SENDSTATUS | COMPRESSION TYPE |
|---|---|---|
| DEFAULT | N | ✓ NOCOMPRESSION<br>✓ JPEG LOSSY<br>✓ JPEG LOSSLESS<br>✓ RLE |
| USIMAGE | N | ✓ NOCOMPRESSION<br>✓ JPEG LOSSY<br>✓ JPEG LOSSLESS<br>✓ RLE |
| CTIMAGE | Y | ✓ NOCOMPRESSION<br>✓ JPEG LOSSY<br>✓ JPEG LOSSLESS<br>✓ RLE |
| MRIMAGE | Y | ✓ NOCOMPRESSION<br>✓ JPEG LOSSY<br>✓ JPEG LOSSLESS<br>✓ RLE |

FIG. 3

| CHECKED ITEM | SETTING OF FIREWALL | IP ADDRESS CONVERSION |
|---|---|---|
| RESULT | NOT ALLOWED | HOST NAME CANNOT BE CONVERTED INTO IP ADDRESS |
| HOW TO FIX | PLEASE ENTER SETTING OF EXCEPTION TO ENABLE COMMUNICATION WITH FOLLOWING DICOM SCP<br><br>HOSTNAMA : REMOTE1(192.168.10.1),<br>SERVICECLASS : STRAGE, PORTNO : 1234 | ARBITRARY CHARACTER STRING INCLUDING HOST NAME THAT FAILED TO BE CONVERTED INTO IP ADDRESS |

| | |
|---|---|
| Mnemonic Name | hoge1 |
| AE Title | hoge |
| Host Name | hoge ▼ | Host Add/Del |
| Port Number | 104 |

Detailed Info>>>    Ping   DICOM Echo   Test

☑ Storage            Details
☐ Storage Commitment  Details
☐ Query              Details
☐ Retrieve
☐ MWM                Details
☐ MPPS               Details OK   Cancel   Apply 701       702

FIG. 7B

| General | Advanced | | | | |
|---|---|---|---|---|---|
| Mnemonic Name | | hoge1 | | | |
| Compression Type | | ☑ Jpeg LossLess | | | |
| | | ☑ Jpeg Lossy | | | |
| | | ☑ RLE | | | |
| Max Number of Request | | 1 | ☐ Check Duplication | | |
| Default Send Condition | | * | ☐ Monochrome Conversion | | |
| ☑ Use Default Port Number | | 104 | | | |

| Image Data Type | | | | | |
|---|---|---|---|---|---|
| CTImage | | Data | Send | Compression | Quality Factor |
| MRImage | | Default | Y | NoCompressi.. | 100 |
| SCImage | | US Image | Y | JpegLossy | 90 |
| TSB_RAW | >>>Add>>> | | | | |
| TSB_RF | <<<Del<<< | | | | |
| TSB_STRESS | | | | | |
| TSB_STRESS_CL | | | | | |
| TUS_CLIP | | | | | |
| US 3D VOLUME | | | | | |
| USMultiFrameImag | | | | | |
| XAImage | | | | | |

[ OK ] [ Cancel ] [ Apply ]

MEDICAL-INFORMATION COMMUNICATION-CONNECTION MANAGEMENT DEVICE AND A METHOD OF MANAGING A MEDICAL-INFORMATION COMMUNICATION CONNECTION

BACKGROUND OF THE INVENTION

1. Field of the Invention

The present invention relates to a medical-information communication-connection management device that manages a communication connection between medical information devices conforming to DICOM (Digital Imaging and Communications in Medicine), which is a standard for information communication in the medical field, and a method of managing a medical-information communication connection. In particular, the present invention relates to a medical-information communication-connection management device that presents countermeasures for communication failures occurring between the medical information devices and a method of managing a medical-information communication connection.

2. Description of the Related Art

Conventionally, in the medical field, diagnostic imaging devices for capturing and acquiring medical images, such as CT devices and MRI devices, have been utilized. The diagnostic imaging device is connected through a network to an image server that executes storage and management of the acquired images. Information such as an image data, etc. is managed by these devices. This diagnostic imaging device may sometimes be referred to as "modality." In addition, medical information terminals are connected through the network to the abovementioned image server and diagnostic imaging device. The operator uses the medical information terminals to refer to the medical images and make a diagnosis. Such communications of medical information are executed by using a specialized protocol for the communication of medical information that is referred to as DICOM (Digital Imaging and Communications in Medicine).

In such communications conforming to the DICOM standard, a connection failure (connection error) may occur. Possible connection errors include various aspects, such as a condition in which a network connection has not been established or a condition in which a network connection has been established but data transmission and reception cannot be executed according to the DICOM standard. There are a number of possible causes for the occurrence of the failure. For example, in some cases, a user may make an error in establishing the settings for the communication (connection conditions). In addition, there may be no CS (Conformance Statement) between the devices and the functions supported by the counter device may be unknown; that is, the connection conditions for the connection devices may not be exchanged between the manufacturers. Furthermore, there may be disagreements between the connection conditions for one device and the support functions of the counter device.

There have been proposals for technologies that assist in analyzing the cause of a connection error by executing a connection test as a means for resolving such connection errors. For example, there is a technique for detecting a service (supported function) implemented by the device that is the communication destination by sending various packets to the device that is the communication destination to be connected to (for example, see Japanese Unexamined Patent Application Publication No. 2002-259242). In addition, there have been proposals for technologies to determine the possibility of a connection with the device that is the communication destination based on the expected output and expected input that are stored in a database and the response from the device that is the communication destination to be connected to and automatically update the CS of the DICOM (for example, see Japanese Unexamined Patent Application Publication No. 2006-110007).

In some cases, conventional methods for connection tests merely provide a result indicating whether the connection was successful or failed. However, in such cases, about it is still unclear what countermeasures should be executed. That is, it is difficult to resolve the problem. Furthermore, the technologies described in the patent literature are for detecting services provided by the counterpart based on the response results, and it is therefore difficult for the party attempting to implement communication to determine the relationship between the connection conditions and the response results and it is difficult to specify the cause of the problem. In addition, as a method for resolving the problem is not presented, it is difficult to immediately respond to the problem. The technologies described in the patent literature also provide the results of judging a connection and the automatic updates of the CS only update the registered connection conditions, and it is therefore difficult to specify the cause of the problem and determine countermeasures.

SUMMARY OF THE INVENTION

The present invention is based on the above mentioned circumstances. The purpose of this invention is to provide a medical-information communication-connection management device and a method of managing a medical-information communication connection that provides countermeasures based on error information.

A first aspect of the present invention is a medical-information communication-connection management device comprising: a request sending part configured to send a first connection request through network communication and a second connection request through DICOM communication executed through said network communication to a medical information device that is the communication destination through a communication network that includes the medical information device that is the communication destination; a response-data receiving part configured to receive first response data for the first connection request and second response data for the second connection request; a first response analyzing part configured to acquire first error information from the first response data by analyzing the error in network communication, when the received first response data is data indicating a failed connection; a second response analyzing part configured to acquire second error information from the second response data by analyzing the error in said DICOM communication, when the received second response data is data indicating a failed connection; a countermeasure storage part configured to store countermeasures for error information in said network communication and countermeasures for error information in said DICOM communication; a countermeasure acquisition part configured to refer to the countermeasure storage part based on at least one of the first error information or the second error information so as to extract a countermeasures for the problem that has occurred; and a display controller configured to cause a display to display the extracted countermeasure.

A second aspect of the present invention is a method for managing connections for communicating medical information using a medical-information communication-connection management device, the device comprising: a connection-conditions storage part configured to preliminarily store connection conditions for its own DICOM communication; and a countermeasure storage part configured to store countermeasures for information regarding errors in network communication, countermeasures for information regarding errors in said DICOM communication, and countermeasures for inconsistencies in connection conditions between said management device and said communication destination, wherein the method comprises: sending a first connection request for said network communication from a request sending part to the medical information device that is said communication destination; receiving first response data for said first connection request through a response-data receiving part; acquiring, when first response data received through said response-data receiving means is data indicating a failed connection, first error information from the first response data by analyzing the error in said network communication using a first response analyzing part; sending, after establishing a connection through said network communication, a second connection request during said DICOM communication to the medical information device that is said communication destination through a request sending part when no error is detected in said first response analyzing stage; receiving second response data for said second connection request through a response-data receiving part; acquiring, when said second response data received through said response-data receiving means is data indicating a failed connection, second error information from said second response data using a second response analyzing part by analyzing the error in said DICOM communication; extracting, when said second response data received through said response data-receiving means is data indicating a successful connection, the connection conditions of the medical information device that is said communication destination based on the second response data using a third response analyzing part, which then compares the connection conditions of the medical information device that is said communication destination with the connection conditions stored in said connection-conditions storage part and acquires inconsistency information as information regarding inconsistent connection conditions; referring to, using a countermeasures acquisition part, information stored in said stage of storing countermeasures based on said first error information, said second error information, and said inconsistency information to extract said countermeasures for the problem that has occurred; and displaying said extracted countermeasure on a display using a display controller.

According to the first and second aspects of the invention, connections on network communication and DICOM communication are sequentially confirmed to extract problems based on respective results to automatically present countermeasures. Thereby, the relation of connection conditions between a communication origin and a communication destination can be grasped so as to easily identify reasons of the problems. Further, countermeasures to occurring problems can be referred to be corresponded with, thus allowing problems to be rapidly solved.

BRIEF DESCRIPTION OF THE DRAWINGS

FIG. 2A is a schematic diagram of connection request of DICOM communication supporting default.

FIG. 2B is a schematic diagram of connection request of DICOM communication not supporting default.

FIG. 3 is a diagram showing errors and their countermeasures in network communications.

FIG. 7A shows a screen for entry of type of services.

FIG. 7B shows a screen for entry of combination of Abstract Syntax and Transfer Syntax to be used.

DETAILED DESCRIPTION OF THE EMBODIMENTS

First Embodiment

Figure 1:
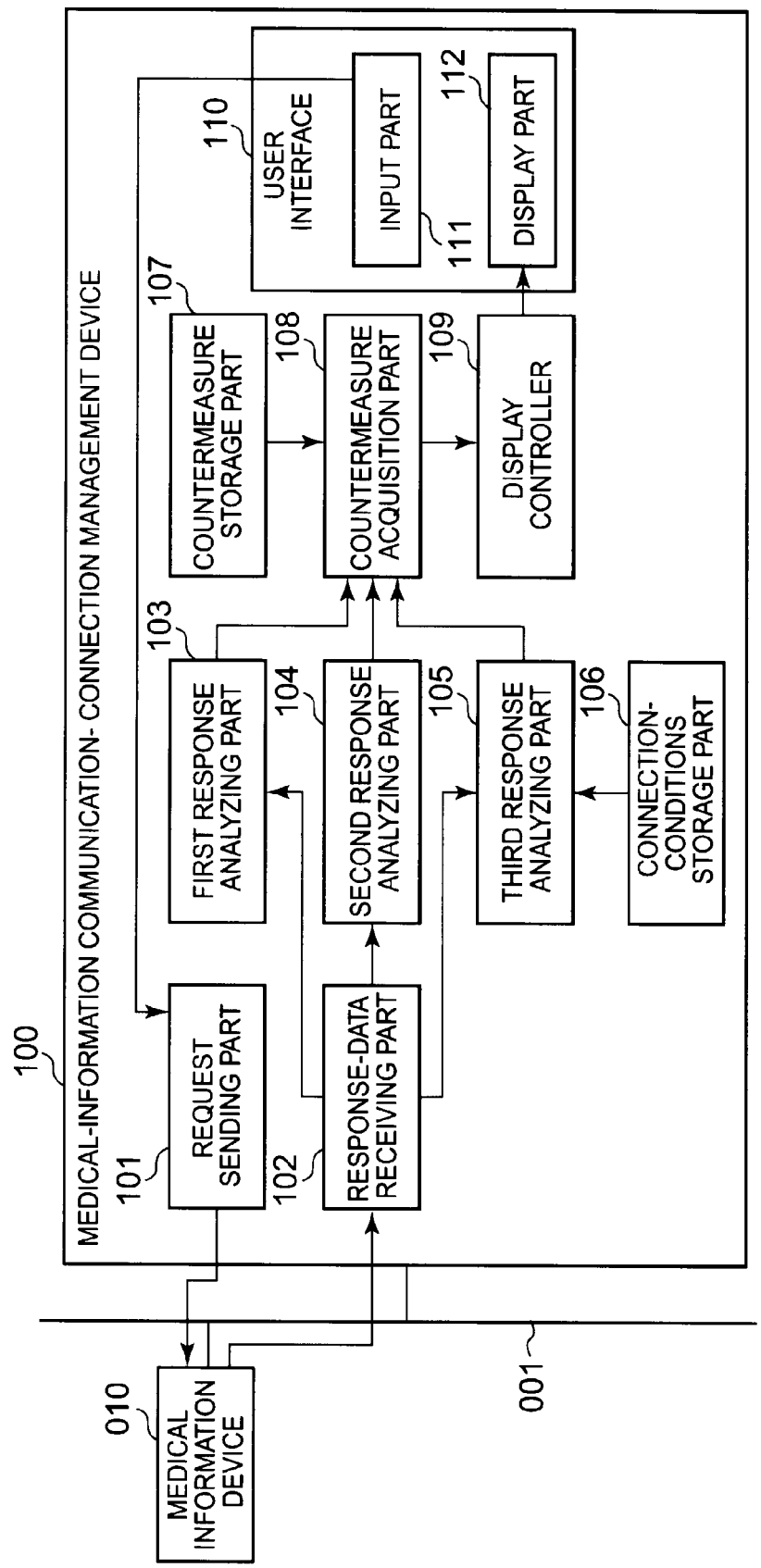
FIG. 1 is a block diagram of a medical-information communication-connection management device of the first and second embodiments of this invention.

A medical-information communication-connection management device according to the first embodiment of the present invention will be described below. FIG. 1 is a block diagram of the medical-information communication-connection management device 100 according to the first embodiment and the second embodiment of the present invention.

As shown in FIG. 1, the medical-information communication-connection management device 100 according to the present embodiment is connected through the network 001 to the medical information device 010. However, references to this "connection through the network 001" in the following descriptions include conditions in which the network 001 is physically disconnected. In order to execute a connection between the medical-information communication-connection management device 100 and the medical information device 010, a connection through the network communication is first implemented. Furthermore, after the connection through the network communication has been established, a connection through the DICOM communication is executed. Specifically, the DICOM communication implements communication through the Session layer, the Presentation layer, and the Application layer among the 7 layers comprising the standard model of OSI (Open Systems Interconnection). That is, the network communication required for implementing the DICOM communication described herein refers to the communication to the Transport layer of the OSI standard model.

The DICOM communication will now be described. To execute the DICOM communication, the types of services to be used during the DICOM communication and the details of the information to be transmitted, etc. are required as the connection conditions. The type of service is also referred to as a "service class" and includes, for example, the Storage Service Class. The details of the information to be transmitted include, for example, CT images and MRI images. The details of the information to be transmitted are hereinafter referred to as an "object". This object also corresponds to an example of the "type of data to be the subject" of the present invention. Herein, the "services" described above refer to functions to be implemented by the device. For example, the "Storage Service Class" described above is a function for transferring images between devices. A combination of the "type of service" and the "object" is referred to as the SOP class in the DICOM standard. This SOP class, when represented as a syntax for the program, is referred to as an "Abstract Syntax." A combination of the "type of service" and the "object" is hereinafter referred to as an "Abstract Syntax." This "Abstract Syntax" indicates "the process to be executed" for "what object." The "what object" described herein corresponds to the "object", and "the process to be executed" corresponds to the type of service. Specific examples include the "CT Image Storage SOP Class". This CT Image Storage SOP Class represents executing the service of image storage for the object CT image.

In addition, the connection conditions for the DICOM communication include a method for encoding data, and this data encoding method is hereinafter referred to as a "Transfer Syntax". This "Transfer Syntax" refers to a data encoding method according to the DICOM standard, such as decompression and compression and little endian. Without defining this method, data interpretation cannot be executed because the data arrangement is unknown. This "Transfer Syntax" that is a data encoding method corresponds to an example of the "method for constructing data" of the present invention.

The medical information device 010 sends and receives medical information such as medical images. Examples of this medical information device 010 include image storage devices such as an RIS server, modality, or image storage server, imager devices such as a printer, and image observation devices. Although FIG. 1 shows a condition in which only one medical information device 010 is connected to the network 001, there is no limit to the number of the medical information devices 010. That is, as long as the medical information device 010 is connected through the network 001 and capable of sending and receiving data with the medical-information communication-connection management device 100, the number of medical information devices 010 may be arbitrary. This medical information device 010 corresponds to an example of the "medical information device that is the communication destination" of the present invention.

The medical-information communication-connection management device 100 according to the present embodiment may be placed in the medical information device 010. That is, the medical-information communication-connection management device 100 may be placed as a part of the functions of the medical information device 010. In such a case, the medical-information communication-connection management device 100 is used to manage the communication connections of the medical information device 010 in which it is incorporated.

As shown in FIG. 1, the medical-information communication-connection management device 100 comprises a request sending part 101, a response-data receiving part 102, a first response analyzing part 103, a second response analyzing part 104, a third response analyzing part 105, a connection-conditions storage part 106, a countermeasure storage part 107, a countermeasure acquisition part 108, a display controller 109, and a user interface 110. The user interface 110 also comprises an input part 111 and a display part 112.

An operator such as a physician or a technical expert who implements the settings of the device (hereinafter simply referred to as "operator") uses the input part 111 of the user interface 110 to input the connection conditions for the medical-information communication-connection management device 100 and set the connection conditions. These connection conditions refer to the conditions used for network communication, such as an IP address (Internet Protocol Address), and the conditions used for DICOM communication, such as a type of service and an object to be used for the abovementioned DICOM communication. In the present embodiment, the connection conditions for the DICOM communication that are input by the input part 111 include an "Abstract Syntax" and "Transfer Syntax".

The connection-conditions storage part 106 is composed of information storage media, such as a hard disk or a memory. The connection-conditions storage part 106 stores connection conditions including the "Abstract Syntax" and "Transfer Syntax" that are input by the operator through the input part 111.

The request sending part 101 first sends a connection request through the network communication between the medical information device 010 and the medical-information communication-connection management device 100 to the network communication net. This network communication net is constructed to include the medical information device 010 and the network 001. In addition, this network communication net corresponds to an example of the "communication network" of the present invention. In addition, the connection request described herein corresponds to an example of the "first connection request" of the present invention. When the response-data receiving part 102 described below accepts the connection request through the network communication from the medical information device 010, the network communication between the medical-information communication-connection management device 100 and the medical information device 010 is established. The network communication is specifically a TCP/IP (Transmission Control Protocol/Internet Protocol) connection.

The request sending part 101 comprises a storage area. This storage area in the request sending part 101 preliminarily stores combinations of Abstract Syntaxes and Transfer Syntaxes that can be used by the self as setting files, and these combinations are stored for each of the types of services. The "self" described herein refers to the medical-information communication-connection management device 100. In addition, the condition "that can be used" described herein may be described as "that is supported" below. Furthermore, when the operator inputs a type of service and a combination of an Abstract Syntax and Transfer Syntax to be used through the input part 111, the request sending part 101 receives a connection request including such information. A concrete example of this input is described below.

For example, the medical-information communication-connection management device 100 stores data regarding a settings screen for selecting a combination of an Abstract Syntax and Transfer Syntax that can be used by the management device. The operator executes an operation to display this settings screen through the input part 111. Through this operation, the medical-information communication-connection management device 100 reads out the stored data of this settings screen and displays it on the display part 112. As a result, combinations of Abstract Syntaxes and Transfer Syntaxes that can be used by the management device are displayed on the settings screen in a selectable manner. When the operator selects any of the combinations on this display through the input part 111, the combination of an Abstract Syntax and Transfer Syntax to be used is input. This combination of an Abstract Syntax and Transfer Syntax that can be used by the management device is described in the setting file preliminarily stored in the request sending part 101.

An example of this settings screen is shown in FIG. 7A and FIG. 7B. FIG. 7A is a diagram showing an example of the settings screen for executing an input of the types of services. FIG. 7B is a diagram showing an example of the screen for executing an input of the combination of an Abstract Syntax and Transfer Syntax to be used.

Through the input part 111, the operator checks the boxes for the types of services for implementing a connection request from among the checkboxes 701 shown in FIG. 7A. Furthermore, when implementing detailed settings, the operator uses the input part 111 to designate a button 702. The settings screen in FIG. 7B is thus displayed.

Then, in the settings screen shown in FIG. 7B, the operator uses the input part 111 to designate the combination of an Abstract Syntax and Transfer Syntax to be used.

Then, the request sending part 101 generates a connection request based on the input types of services and the combination of an Abstract Syntax and Transfer Syntax to be used. This connection request is for executing the connection using the abovementioned types of services, and the abovementioned types of services include the abovementioned combination of an Abstract Syntax and Transfer Syntax. Furthermore, the abovementioned combination of an Abstract Syntax and Transfer Syntax is one regulated in the connection conditions for the DICOM communication that are set for the medical-information communication-connection management device 100.

This connection request also refers to a request for executing a negotiation to establish an association. In addition, this connection request is referred to as "A-Association-RQ" in the DICOM. This connection request corresponds to an example of the "second connection request" of the present invention.

A concrete example of a connection request from the request sending part 101 will now be described with reference to FIG. 2A and FIG. 2B. FIG. 2A is a chart for describing a connection request in DICOM communication that supports a Default. FIG. 2B is a chart for describing a connection request in DICOM communication that does not support the Default. For example, when the operator inputs an instruction through the input part 111 to execute a connection request with the Storage service, the request sending part 101 creates a table for executing the connection request for the Storage service as shown in FIG. 2A and FIG. 2B. Then, the request sending part 101 implements the connection request based on this table. Herein, the Default refers to basic image information with no particular format. In addition, this Default is an object used when it is not clear what kind of object should be used. For example, in the table shown in FIG. 2A and FIG. 2B, the Storage service is designated for the type of service. Furthermore, in this table, ImageDataType is designated for the object. This table further indicates with SendStatus whether the management device supports the object.

In summary, when the SendStatus is shown as "Y", it indicates that the object is supported, and in the case of "N", it indicates that the object is not supported. In FIG. 2A, as the SendStatus of the Default is shown to be "Y", the request sending part 101 executes a connection request with the DataType of the Default. Then, as shown in FIG. 2B, as the SendStatus of the Default is shown to be the request sending part 101 does not execute the connection request with the DataType of the Default.

This table shown in FIG. 2A itself corresponds to one type of service, and furthermore, the ImageDataType described in this table corresponds to the object. Therefore, based on these two items of information, it is possible to determine the Abstract Syntax to be used for the connection request. In addition, as the Compression Type shown in FIG. 2A and FIG. 2B corresponds to the Transfer Syntax, based on the information regarding this Compression Type, it is possible to determine the Transfer Syntax to be used for the connection request.

When the abovementioned network communication has been established, the request sending part 101 sends a connection request for the DICOM communication created by the management device to the medical information device 010. Specifically, the request sending part 101 refers to the table in FIG. 2A or 2B created by the management device and sends a connection request based on the set items in the table. This connection request includes a combination of an Abstract Syntax and Transfer Syntax as mentioned above. This connection request is executed by the type of service.

For example, when Storage and Q/R (Query/Retrieve) are selected as the types of services, first, a connection request for Storage is executed, and after the response data is returned, a connection request for Q/R is to be implemented.

The response-data receiving part 102 acquires response data returning from the medical information device 010 or the network 001, that is, the response data to the connection request through the network communication sent from the request sending part 101. The network 001 shows the network communication net. This response data corresponds to an example of the "first response data" of the present invention. When the connection is successfully established, the response-data receiving part 102 receives response data regarding acceptance of the connection request for the network communication.

In addition, when the establishment of the connection fails, the response data cannot be received from the medical information device 010, and as response data, an error message is received from the network 001. When establishment of the connection through the network communication has failed, the response-data receiving part 102 outputs the response data to the first response analyzing part 103.

When the connection through the network communication is successfully established, the response-data receiving part 102 then acquires response data for the connection request in the DICOM communication from the medical information device 010. This response data corresponds to an example of the "second response data" of the present invention.

For the connection request through the DICOM communication as well, there are cases of successful responses and those of failed responses. The cases of successful responses refer to those in which response data regarding acceptance of the connection request, known as A-Association-AC, is received. This "A-Association-AC" is hereinafter referred to as "A-ASS-AC". A-ASS-AC includes a PresentationContext-ID, Result, and Reason. The response data regarding acceptance of this connection request corresponds to an example of "data regarding successful connection" of the present invention. In addition, the cases of failed responses refer to those in which response data regarding a response rejection known as A-Association-RJ or a response discontinuation known as A-ABORT is received. This "A-Association-RJ" is hereinafter referred to as A-ASS-RJ. A-ASS-RJ includes a Result, Source, and Reason.

A-ABORT includes a Source and Reason. Such response data indicating response rejection and response discontinuation correspond to examples of "data regarding failed connection" of the present invention.

When the response has failed, the response-data receiving part 102 outputs the received response data to the second response analyzing part 104. When the response is successful, the response-data receiving part 102 outputs the received response data to the third response analyzing part 105.

The first response analyzing part 103 is constructed to include a CPU and a storage area such as a memory. The first response analyzing part 103 stores a setting file in which the procedure of response analysis is described. In the present embodiment, the first response analyzing part 103 sequentially executes, for example, the following checks based on this setting file. These include checking of the firewall, the availability of communication with a DICOM SCP (Service Class Provider), the availability of executing IP name resolution, whether the gateway is reached, whether the IP address and the subnet mask are correct, whether the network cable is connected, whether the network adapter is not broken, and other checks. Next, an example of processing performed by the first response analyzing part 103 based on this setting file will be described below.

First, the first response analyzing part 103 receives, from the response-data receiving part 102, an input of the response data regarding an error message that the network communication has failed.

The first response analyzing part 103 checks the network information, the condition of the firewall, etc. Specifically, the first response analyzing part 103 checks the firewall, the availability of communication to the DICOM SCP (Service Class Provider), whether the IP name can be resolved, whether the gateway is reached, whether the IP address and the subnet mask are correct, whether the network cable is connected, and whether the network adapter is not broken.

These checks are implemented for all of the DICOM SCP. Then, the first response analyzing part 103 acquires an application error log for the errors that have occurred during each check.

For example, when checking the firewall, the first response analyzing part 103 checks whether the DICOM network port is available for the firewall. As a result of checking, if the relevant port is available, the first response analyzing part 103 acquires a result indicating that the firewall is OK. On the other hand, if the relevant port is not available, the first response analyzing part 103 acquires a result indicating that the port is not accepted. Then, the first response analyzing part 103 extracts error information from the acquired application error log and outputs the relevant error information to the countermeasure acquisition part 108. The error information extracted by this first response analyzing part 103 corresponds to an example of the "first error information" of the present invention.

The second response analyzing part 104 is constructed to include a CPU and a storage area such as a memory. The second response analyzing part 104 receives, from the response-data receiving part 102, an input of response data that the response has failed during the DICOM communication.

The second response analyzing part 104 extracts a parameter indicating the reason for failure from the input response data. This parameter is, for example, an error code. As described above, the response data A-ASS-RJ and A-ABORT include a Reason. According to this Reason, the second response analyzing part 104 acquires a parameter indicating the reason for failure. In addition, the second response analyzing part 104 outputs the extracted parameter indicating the reason for failure to the countermeasure acquisition part 108. The parameter indicating this reason for failure corresponds to an example of the "second error information" of the present invention.

The third response analyzing part 105 is constructed to include a CPU and a storage area such as a memory. This third response analyzing part 105 receives an input of response data from the response-data receiving part 102 indicating that the response is successful during the DICOM communication. The relevant response data includes an accepted combination of an Abstract Syntax and Transfer Syntax as well as a rejected combination of an Abstract Syntax and Transfer Syntax.

The third response analyzing part 105 extracts, from the input response data, a combination of an Abstract Syntax and Transfer Syntax that is accepted as well as a rejected combination of an Abstract Syntax and Transfer Syntax. When executing the extraction, the third response analyzing part 105 compares the accepted combination and the rejected combination with the combinations stored in the connection-conditions storage part 106. These stored combinations are combinations of Abstract Syntaxes and Transfer Syntaxes to be used by the management device. Then, as a result of the comparison, the third response analyzing part 105 outputs, to the countermeasure acquisition part 108, information regarding any inconsistent combinations among the combinations of Abstract Syntaxes and Transfer Syntaxes supported by the management device and the combinations of Abstract Syntaxes and Transfer Syntaxes supported by the medical information device 010. Such information regarding the inconsistent combinations is hereinafter referred to as "inconsistency information."

The countermeasure storage part 107 is constructed to include storage media such as hard disks. The countermeasure storage part 107 stores countermeasures for error information, etc. Examples include error information included in the application error log through the network communication and countermeasures corresponding to the relevant error information. Other examples include parameters included in the response data in cases of a failed response during the DICOM communication indicating the reason for failure and countermeasures for the parameter. Other examples include inconsistent combinations of Abstract Syntaxes and Transfer Syntaxes in communication devices and countermeasures corresponding to the respective relevant combinations.

These countermeasures are constructed in a message-like format, for example, to be referred to by the operator.

Each of those countermeasures may be thought of as conditions that are simply stored in a table or the like. However, it is actually a program that describes outputting a certain countermeasure when a certain condition is entered. This program can be referred to as a "dictionary" instead. For example, the countermeasure storage part 107 stores a correspondence table as shown in FIG. 3 as information regarding the application error log during the network communication and countermeasures for the relevant error information. FIG. 3 is a diagram for describing the table that indicates errors in the network communication and countermeasures corresponding to the relevant errors.

The countermeasure acquisition part 108 is constructed to include a CPU and a storage area such as a memory. The countermeasure acquisition part 108 acquires error information from the first response analyzing part 103 when the connection request for the network communication is rejected. Such error information is extracted from the information regarding the application error log.

Then, the countermeasure acquisition part 108 refers to the countermeasure storage part 107 in order to acquire the countermeasure corresponding to the relevant error based on the acquired application error log. In addition, the countermeasure acquisition part 108 acquires information regarding the countermeasure corresponding to the error information of the application error log based on the reference result.

For example, when the countermeasure acquisition part 108 acquires information regarding refusal for the firewall as the application error log in the network communication, the countermeasure acquisition part 108 refers to the table shown in FIG. 3 stored in the countermeasure storage part 107 and thereby acquires a countermeasure corresponding to the relevant refusal information. That is, the countermeasure acquisition part 108 refers to "How to fix" as a countermeasure when the firewall is not authorized. Consequently, the countermeasure acquisition part 108 acquires information regarding the countermeasure for the error as shown in the area 301 in FIG. 3. In the example of FIG. 3, the following countermeasure is obtained: "In order to enable communication with the following DICOM SCP, please execute an exceptional setting. HostName:Remote1 (192.168.10.1), ServiceClass: Storage, PortNo:1234." Then, the countermeasure acquisition part 108 outputs information regarding the acquired countermeasure to the display controller 109.

In addition, when the response to the DICOM communication fails after the network communication has been established, the countermeasure acquisition part 108 receives an input of the parameter from the second response analyzing part 104 indicating the reason for the failure. The countermeasure acquisition part 108 refers to the parameter that indicates the reason for the failure stored in the countermeasure storage part 107 and a countermeasure corresponding to the relevant parameter based on the input parameter. Furthermore, as a result of the reference, the countermeasure acquisition part 108 acquires a countermeasure corresponding to the parameter.

Examples of this countermeasure to be acquired include the following. That is, when an error of an incorrect Calling AE/Called AE Title has occurred, the countermeasure acquisition part 108 determines that the relevant error has occurred based on the acquired parameter.

Furthermore, the countermeasure acquisition part 108 acquires the countermeasure, "Correct Calling AE/Called AE Title", based on the relevant error. In addition, when the countermeasure acquisition part 108 determines that an error of insufficient resources (for example, insufficient memory) has occurred based on the parameter, a countermeasure is acquired to supplement the insufficient resources.

The countermeasure acquisition part 108 outputs the acquired countermeasure to the display controller 109.

When the response through the DICOM communication is successful after establishing the network communication, the countermeasure acquisition part 108 receives an input of inconsistency information from the third response analyzing part 105. For example, when some Transfer Syntaxes are rejected for a given Abstract Syntax, the countermeasure acquisition part 108 makes a determination in the following manner. That is, it is determined that although it is possible to basically use the relevant service for the object included in the relevant specific Abstract Syntax, it is not possible to use a service using the rejected Transfer Syntax.

When there is an inconsistency in the combinations of Abstract Syntaxes and Transfer Syntaxes between the communication devices, the countermeasure acquisition part 108 refers to the countermeasures corresponding to each inconsistent combination. As a result of the reference, the countermeasure acquisition part 108 acquires a method of using the service with the rejected Transfer Syntax as a countermeasure. In addition, when all of the Transfer Syntaxes in the specific Abstract Syntax are rejected, the countermeasure acquisition part 108 determines that the types of services included in the relevant Abstract Syntax cannot be used. Then, the countermeasure acquisition part 108 refers to a countermeasure corresponding to each of the inconsistent combinations for the cases in which there is an inconsistency in the combinations of Abstract Syntaxes and Transfer Syntaxes stored in the countermeasure storage part 107 between the communication devices. Furthermore, the countermeasure acquisition part 108 acquires a countermeasure to use the types of services included in the relevant Abstract Syntax. The countermeasure acquisition part 108 outputs the acquired countermeasure to the display controller 109.

Figure 4:
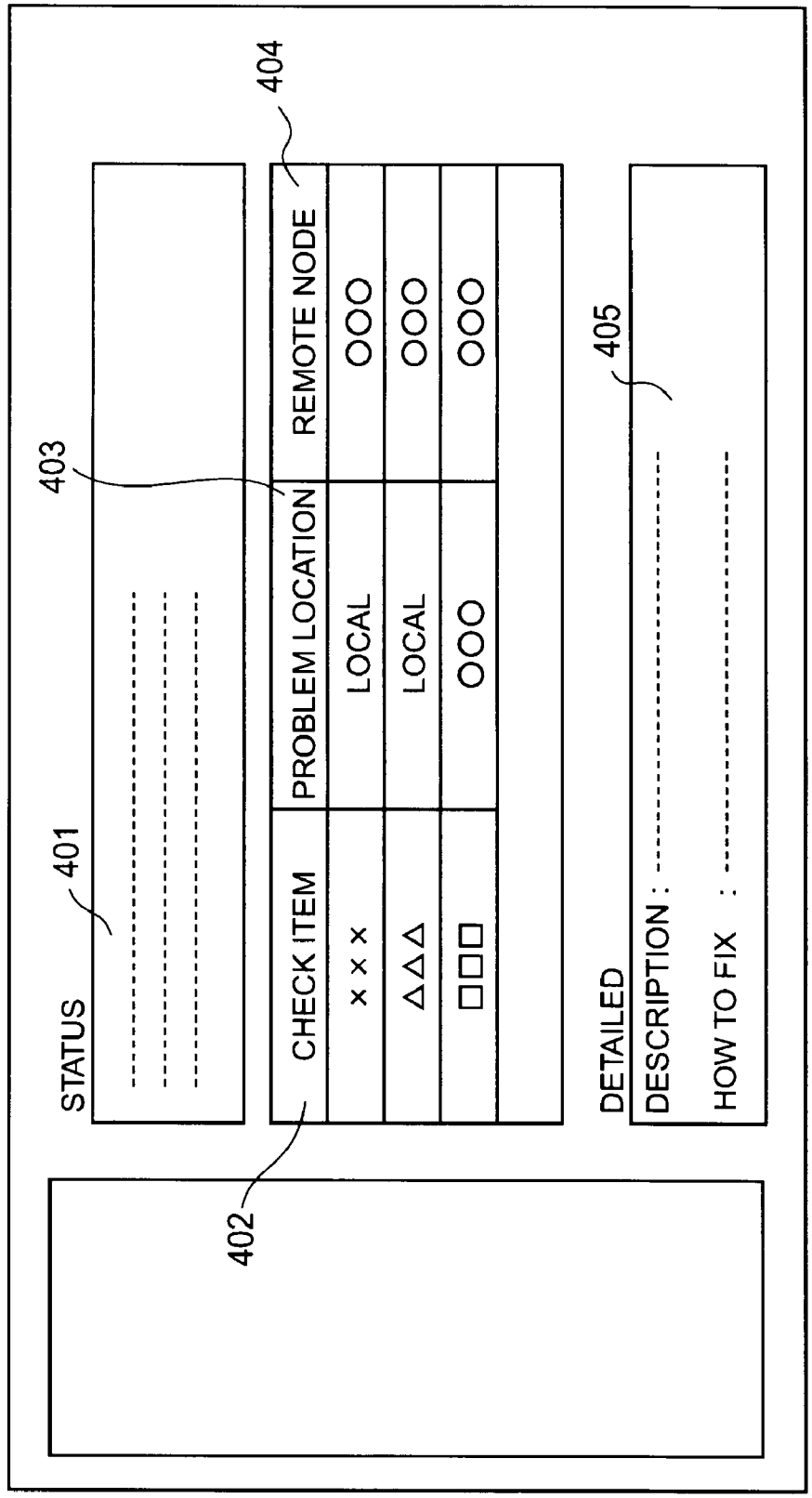
FIG. 4 shows a display screen for displaying countermeasures.

The display controller 109 causes the display part 112 to display the acquired countermeasure. In the present embodiment, the display controller 109 causes the display part 112 to display a display screen that shows the countermeasure as shown in FIG. 4. FIG. 4 is an example diagram of the display screen that shows the countermeasure. This display screen is hereinafter referred to as a countermeasure display screen.

Next, the countermeasure display screen of the present embodiment shown in FIG. 4 will be described. The area 401 in FIG. 4 is an area that shows the progress of analysis tasks in response to the connection request currently being executed. Specifically, in the area 401, the following information is shown. For example, the progress of the analysis of response data through the network communication and the progress of the analysis of response data through the DICOM communication are displayed. Furthermore, in the analyses, checks that have been completed thus far and checks that are currently being conducted are displayed. Also displayed is information regarding the checks in which an error has occurred. Such information can be acquired from information that shows the determination of the countermeasure by the countermeasure acquisition part 108 or information that shows the acquisition of a response indicating successful communication by the response-data receiving part 102.

In addition, the area 402 is an area for displaying checked items in which an error has occurred. For example, for checks performed through the network communication, checks of the firewall and checks of the IP address conversion are displayed. The area 403 also displays the location where the error has occurred. For example, a display of Local indicates that an error has occurred in the medical-information communication-connection management device 100. When an error has occurred in the communication destination, identification information of the medical information device 010 is displayed. These errors in the communication destination include, for example, cases of failure in the response to the connection request through the DICOM communication as well as conditions in which the resources of the medical information device 010 are insufficient for the response data or in which the medical information device 010 is busy. Such information can be acquired from the error information acquired by the countermeasure acquisition part 108.

In addition, the area 404 displays identification information of the medical information device 010 at the communication destination that executes the connection request. Such information can be acquired from the identification information on the sender, etc. The identification information on the sender, etc. is described in the response data that the response-data receiving part 102 has received.

Then, in the area 405, the error details and the countermeasures for the error are displayed. Furthermore, in the area 405, a display indicating whether correction is possible is shown. Such information can be obtained from the information that is input from the countermeasure acquisition part 108.

Furthermore, a specific example of the details displayed in the countermeasure display screen will be described. For example, when the medical information device 010 that is the communication destination does not support Q/R, the following is displayed in each of the areas 403 and 405. That is, in the area 403, "Local" is displayed. In the area 405, the error details are displayed as "All Presentation contexts are rejected" and "The counter station does not support this DICOM service." Furthermore, in the area 405, as a countermeasure for the error ("How to fix"), "Invalidate the 'Query' service for the counter station setting" is displayed, and the possibility of correction is displayed as "Possible."

As another example, when the medical information device 010 at the communication destination does not support reception of compressed images, "Local" is displayed in the area 403. In the area 405, the error details "Next Transfer Syntax has been rejected" and "1:RLE" are displayed. Furthermore, in the area 405, as a countermeasure for the error ("How to fix"), "Invalidate the compression option 'RLE' in the counterpart settings", "Or, set the sending option of the rejected image type to be 'N'", and "AE (application entity) title: hoge" are displayed, and the possibility of correction is displayed as "Possible."

In the present embodiment, in order to facilitate the search for the cause of problem, the display screen as shown in FIG. 4 shows information regarding the location in which the problem has occurred, the error details, etc. However, the display screen may not display them. For example, the relevant display screen shown in the display part 112 may display only the countermeasure.

Figure 5:
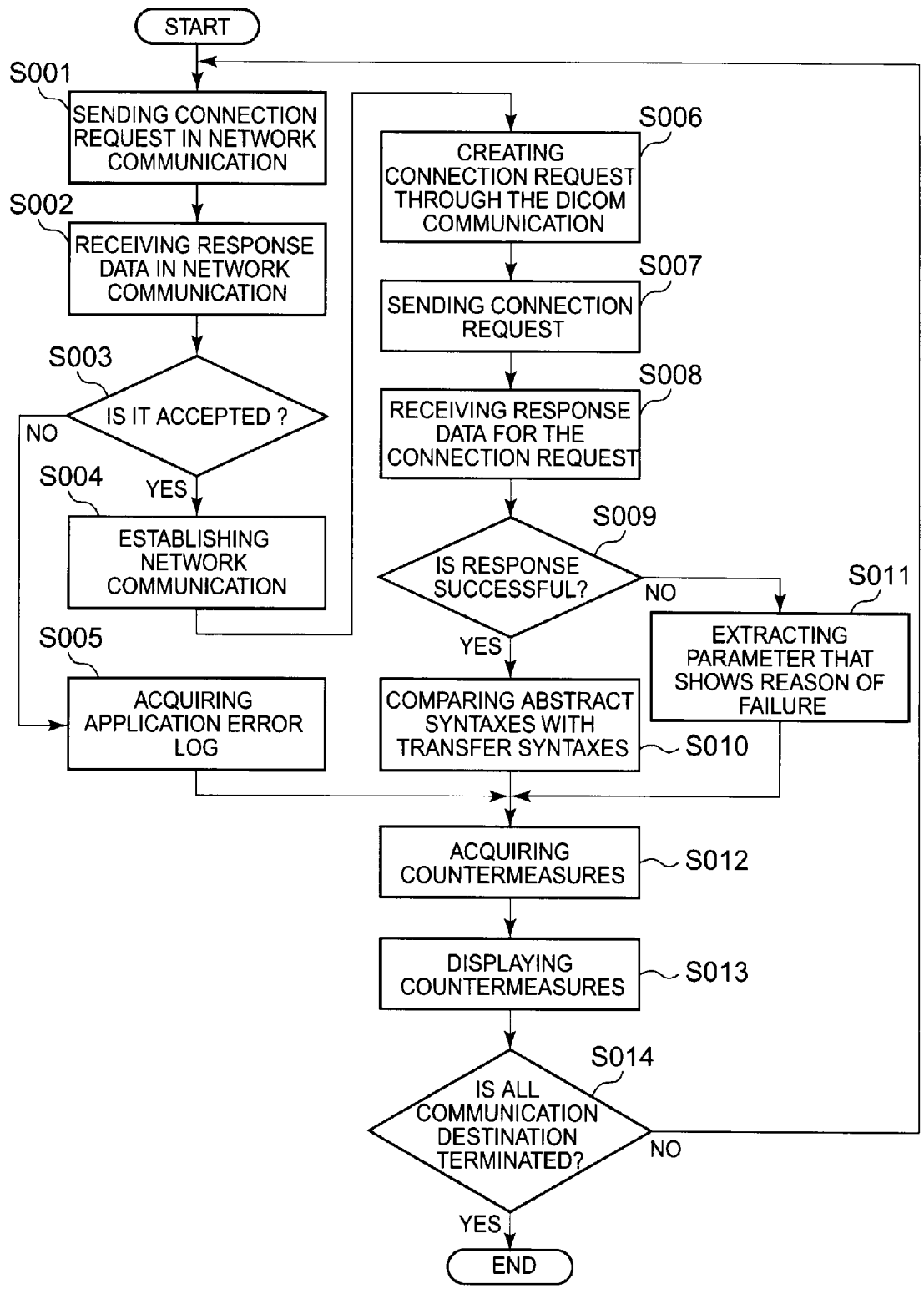
FIG. 5 is a flowchart describing an outline of a series of actions for analyzing the response data for the connection request and providing the countermeasure through the medical-information communication-connection management device according to the first embodiment of the present invention.

Next, among the actions of the medical-information communication-connection management device 100 of the present embodiment, those related to data analysis in response to the connection request and those related to providing the countermeasure will be described with reference to FIG. 5. FIG. 5 is a flowchart describing an outline of a series of actions for analyzing the response data for the connection request and providing the countermeasure through the medical-information communication-connection management device 100 according to the first embodiment of the present invention.

This flowchart assumes that the connection conditions of the self management device are already stored in the connection-conditions storage part 106. In addition, it is assumed that the countermeasure storage part 107 stores error information in the network communication, parameters indicating the reason for a failure during the DICOM communication, and countermeasures for each inconsistency information. Accordingly, in the following explanation, steps for storing such information are omitted.

Step S001: The request sending part 101 sends a connection request in the network communication through the network to the communication destination that is a specific device among the connected medical information devices 010.

Step S002: The response-data receiving part 102 receives the response data for the connection request from the medical information device 010 or the network 001.

Step S003: The response-data receiving part 102 determines whether the connection request is accepted or rejected based on the response data. When the connection request is accepted (S003: Yes), go to Step S004. When the connection request is rejected (S003: No), go to Step S005.

Step S004: The network communication between the medical-information communication-connection management device 100 and the medical information device 010 is established.

Step S005: The first response analyzing part 103 acquires information from the response-data receiving part 102 that establishment of the network communication has failed. The first response analyzing part 103 performs checks of the settings in the network communication, such as checks of the firewall and checks of the IP address conversion, based on the relevant information.

Furthermore, the first response analyzing part 103 acquires an application error log and also acquires error information from the relevant application error log. The first response analyzing part 103 outputs the acquired error information to the countermeasure acquisition part 108.

Step S006: The request sending part 101 refers to the preliminarily stored setting file of the connection conditions of the management device based on the type of service input by the operator and the combination of an Abstract Syntax and Transfer Syntax to be used. In addition, the request sending part 101 creates a connection request through the DICOM communication, that is, a connection request including a combination of an Abstract Syntax and Transfer Syntax to be used by the management device.

Step S007: The request sending part 101 sends a connection request through the created DICOM communication to the medical information device 010.

Step S008: The response-data receiving part 102 receives response data for the connection request through the DICOM communication.

Step S009: The response-data receiving part 102 determines whether the response is successful, that is, whether the response data A-ASS-AC has returned. The response-data receiving part 102 also determines whether the response has failed, that is, whether the response data A-ASS-RJ or A-ABORT has returned. When the response is successful (S009: Yes), go to Step S010. When the response fails (S009: No), go to Step S011.

Step S010: The third response analyzing part 105 receives the response data from the response-data receiving part 102. Then, the third response analyzing part 105 extracts, from the received response data, combinations of Abstract Syntaxes and Transfer Syntaxes that are available for the medical information device 010. The third response analyzing part 105 compares the relevant extracted combination with the combinations stored in the connection-conditions storage part 106.

The stored combinations refer to the combinations of Abstract Syntaxes and Transfer Syntaxes to be used by the management device. Furthermore, the third response analyzing part 105 generates inconsistency information. The inconsistency information refers to information regarding inconsistent combinations of Abstract Syntaxes and Transfer Syntaxes that are inconsistent between the medical information device 010 and the management device. The third response analyzing part 105 outputs the generated inconsistency information to the countermeasure acquisition part 108.

Step S011: The second response analyzing part 104 receives response data from the response-data receiving part 102. Then, the second response analyzing part 104 extracts, from the received response data, a parameter that shows the reason for the failure. Then, the second response analyzing part 104 outputs the extracted parameter that shows the reason for the failure to the countermeasure acquisition part 108.

Step S012: The countermeasure acquisition part 108 refers to the countermeasure storage part 107 to acquire information regarding a countermeasure that corresponds to the error information through the network communication input from the first response analyzing part 103, a parameter that shows the reason for failure input from the second response analyzing part 104, or inconsistency information input from the third response analyzing part 105. The countermeasure acquisition part 108 outputs the acquired information regarding the countermeasure to the display controller 109.

Step S013: The display controller 109 causes the display part 112 to display the countermeasure based on the information regarding the countermeasure input from the countermeasure acquisition part 108.

Step S014: The request sending part 101 determines whether a connection request has been sent to all of the medical information devices 010 that execute communication with the medical-information communication-connection management device 100 through the network. If the connection request has been sent to all of the medical information devices 010 (S014: Yes), sending of the connection request is completed. If the connection request has not been sent to some of the medical information devices 010 (S014: No), repeat Step S001 to Step S013 for the medical information devices 010 to which the connection request has not been sent.

For convenience of explanation, in the medical-information communication-connection management device 100 of the present embodiment, at Step S006, the request sending part 101 creates a connection request through the DICOM communication. However, the connection request may be created at any timing as long as it is after receiving an input from the operator and before the processing at Step S007 is completed. For example, the request sending part 101 may create a connection request through the DICOM communication at a stage prior to Step S001 if the operator's designation of the type of service has already been received before starting to send the connection request.

Furthermore, in the flowchart in FIG. 5, the medical-information communication-connection management device 100 is constructed to acquire a countermeasure after confirming all of the settings in the network communication and to acquire the application error log.

However, as it is not limited to this, for example, the countermeasure acquisition part 108 may be constructed to acquire an error message and obtain a countermeasure every time after confirming each individual setting. In addition, the countermeasure acquisition part 108 may be constructed to acquire a countermeasure as such and cause the display part 112 to display the countermeasure every time.

Figure 6:
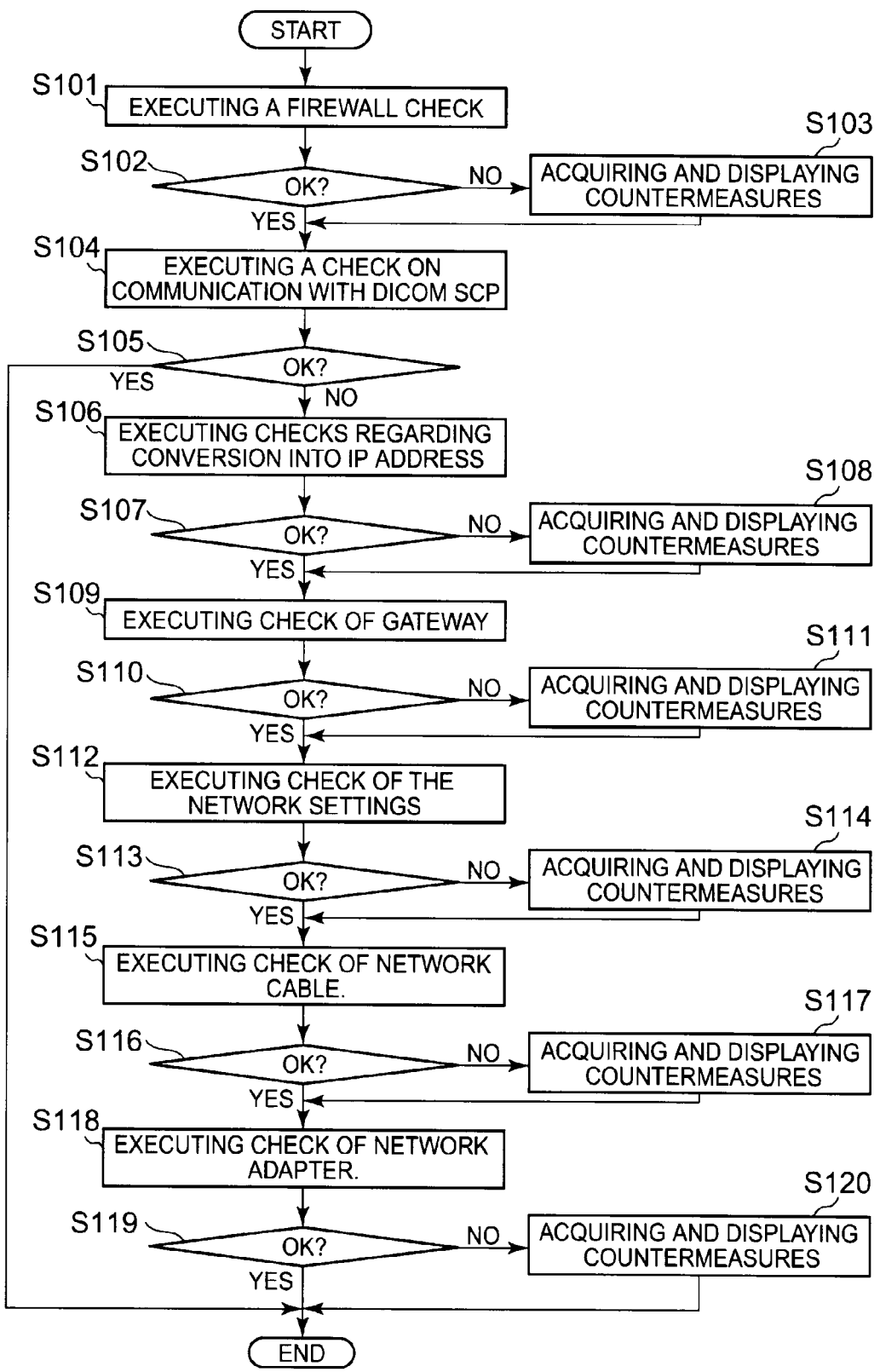
FIG. 6 is a flowchart that shows an outline of a series of actions for confirming the settings through the network communication in the medical-information communication-connection management device according to the first embodiment of this invention.

Next, with reference to FIG. 6, the actions by which the medical-information communication-connection management device 100 of the present embodiment confirms the settings through the network communication will be described. Herein, FIG. 6 is a flowchart that shows an outline of a series of actions for confirming the settings through the network communication in the medical-information communication-connection management device 100 according to the first embodiment. In the following explanation, we will describe a construction to acquire a countermeasure corresponding to an error message resulting from the relevant check of the settings and display the relevant countermeasure every time when various checks of the settings are acquired through the network communication. However, rather than every time when various checks of the settings are acquired, as mentioned above, it may be constructed to acquire the countermeasures all together after completing checks for all settings.

Step S101: The first response analyzing part 103 executes a firewall check.

Step S102: The first response analyzing part 103 determines whether passing through the firewall is accepted as a result of the relevant check. If accepted (S102: Yes), go to Step S104, and if rejected (S102: No), go to Step S103.

Step S103: The countermeasure acquisition part 108 refers to the countermeasure storage part 107 based on the error information input from the first response analyzing part 103. As a result of the reference, the countermeasure acquisition part 108 acquires information regarding the countermeasure. Then, the display controller 109 causes the display part 112 to display the countermeasure for the error that has occurred based on the information regarding the countermeasure acquired by the countermeasure acquisition part 108.

Step S104: The first response analyzing part 103 executes a check on the possibility of communication with the DICOM SCP.

Step S105: The first response analyzing part 103 determines, as a result of the relevant check, whether communication with the DICOM SCP can be executed. If the communication can be executed (S105: Yes), checking of the settings through the network communication is completed. If the communication cannot be executed (S105: No), go to Step S106.

Step S106: The first response analyzing part 103 executes checks regarding the conversion of the host name into an IP address.

Step S107: The first response analyzing part 103 determines as a result of the relevant checking, whether the conversion of the host name to the IP address has been successfully implemented. If successful (S107: Yes), go to Step S109. If failed (S107: No), go to Step S108.

Step S108: The countermeasure acquisition part 108 refers to the countermeasure storage part 107 based on the error information input from the first response analyzing part 103. As a result of the reference, the countermeasure acquisition part 108 acquires information regarding the countermeasure. Then, the display controller 109 causes the display part 112 to display the countermeasure for the error that has occurred based on the information regarding the countermeasure acquired by the countermeasure acquisition part 108.

Step S109: The first response analyzing part 103 executes a check of the communication with the default gateway.

Step S110: As a result of the relevant check, the first response analyzing part 103 determines whether the communication with the default gateway has been successfully executed. If the communication is successfully executed (S110: Yes), go to Step S112. If the communication has failed (S110: No), go to Step S111.

Step S111: The countermeasure acquisition part 108 refers to the countermeasure storage part 107 based on the error information input from the first response analyzing part 103. As a result of the reference, the countermeasure acquisition part 108 acquires information regarding the countermeasure. Then, the display controller 109 causes the display part 112 to display the countermeasure for the error that has occurred based on the information regarding the countermeasure input from the countermeasure acquisition part 108.

Step S112: The first response analyzing part 103 executes a check of the network settings in the network adapter possessed by the management device, such as the IP address and the subnet mask.

Step S113: As a result of the relevant check, the first response analyzing part 103 determines whether the network settings are correct or wrong. If the network settings are correct (S113: Yes), go to Step S115. If the network settings are wrong (S113: No), go to Step S114.

Step S114: The countermeasure acquisition part 108 refers to the countermeasure storage part 107 based on the error information input from the first response analyzing part 103. As a result of the reference, the countermeasure acquisition part 108 acquires information regarding the countermeasure. Then, the display controller 109 causes the display part 112 to display the countermeasure for the error that has occurred based on the information regarding the countermeasure input from the countermeasure acquisition part 108.

Step S115: The first response analyzing part 103 executes a check of the connection of the network cable.

Step S116: As a result of the relevant check, the first response analyzing part 103 determines whether the network cable is connected.

If the network cable is connected (S116: Yes), go to Step S118.

If the network cable is not connected (S116: No), go to Step S117.

Step S117: The countermeasure acquisition part 108 refers to the countermeasure storage part 107 based on the error information input from the first response analyzing part 103. As a result of the reference, the countermeasure acquisition part 108 acquires information regarding the countermeasure. Then, the display controller 109 causes the display part 112 to display the countermeasure for the error that has occurred based on the information regarding the countermeasure input from the countermeasure acquisition part 108.

Step S118: The first response analyzing part 103 executes a check of the network adapter.

Step S119: As a result of the relevant check, the first response analyzing part 103 determines whether the network adapter is invalid.

If the network adapter is invalid (S119: No), go to Step S120. If the network adapter is valid (S119: Yes), confirmation of the settings through the network communication is completed.

Step S120: The countermeasure acquisition part 108 refers to the countermeasure storage part 107 based on the error information input from the first response analyzing part 103. As a result of the reference, the countermeasure acquisition part 108 acquires information regarding the countermeasure. Then, the display controller 109 causes the display part 112 to display the countermeasure for the error that has occurred based on the information regarding the countermeasure input from the countermeasure acquisition part 108.

Since there are differences in the actions of the request sending part 101, the third response analyzing part 105, and the countermeasure acquisition part 108 by service class, the actions of these three functional parts will now be described in detail by service class.

First, cases involving the Storage, Query/Retrieve, MWM, and MPPS service classes will be described. The request sending part 101 executes a connection request based on the combination of a designated Abstract Syntax and Transfer Syntax. If a response indicating acceptance of the connection is received, the third response analyzing part 105 determines that there is no problem. If a response indicating rejection of the connection is received, inconsistency information is sent to the countermeasure acquisition part 108. The countermeasure acquisition part 108 acquires the countermeasure corresponding to the rejected combination of an Abstract Syntax and Transfer Syntax.

Next, cases involving the Print service class will be described.

The Print service class includes two types of SOP Classes: "Basic Grayscale Print Management Meta SOP Class" and "Basic Color Print Management Meta SOP Class." The Meta SOP Class comprises multiple SOP Classes. The SOP Classes of this Meta SOP Class include SOP Classes that must be supported according to the regulations.

Hereinafter, the SOP Classes that must be supported according to the regulations is referred to as the "essential SOP Classes."

The essential SOP Classes includes four SOP Classes: "Basic Film Session SOP Class". "Basic Film Box SOP Class", "Basic Grayscale Image Box SOP Class", and "Printer SOP Class". In addition, for each Meta SOP Class, a nonessential optional SOP Class is defined.

For example, "Basic Grayscale Print Management Meta SOP Class" may include an optional SOP Class that is "Print Job SOP Class."

The request sending part 101 executes a connection request with the designated Abstract Syntax and the SOP Class possessed by the relevant Meta SOP Class as the Abstract Syntax. For example, when the management device supports the "Basic Grayscale Print Management Meta SOP Class", a connection request is executed for five Abstract Syntaxes of the "Basic Grayscale Print Management Meta SOP Class", "Basic Film Session SOP Class", "Basic Film Box SOP Class", "Basic Grayscale Image Box SOP Class" and "Printer SOP Class". Furthermore, when the management device supports the optional SOP Class, a connection request is executed by adding the SOP Class to the Abstract Syntax. For example, when the management device supports the "Basic Grayscale Print Management Meta SOP Class" and "Printer Configuration Retrieval SOP Class", a connection request is executed for six Abstract Syntaxes, including the relevant five and the additional "Printer Configuration Retrieval SOP Class." Next, the actions of each functional part will be described according to the type of response to the sent connection request.

When all of the connection responses to the Print service class are accepted, the third response analyzing part 105 determines that there is no problem. If a response indicating rejection of the connection is received, the third response analyzing part 105 determines which SOP Class is rejected. When the rejected SOP Class is the optional SOP Class and the essential SOP Class is accepted, the medical information device 010 that is the communication destination does not necessarily have to support the optional SOP Class.

Accordingly, the third response analyzing part 105 determines that there is no problem and does not output the inconsistency information. That is, the countermeasure is not displayed.

When the Meta SOP Class is rejected, the third response analyzing part 105 outputs the inconsistency information corresponding to the Meta SOP Class to the countermeasure acquisition part 108. In this case, the countermeasure acquisition part 108 acquires the countermeasure. The countermeasure acquisition part 108 also outputs, to the display controller 109, the countermeasure and information that the rejected Meta SOP Class cannot be used. The display controller 109 causes the display part to display the information that the rejected Meta SOP Class cannot be used and the countermeasure.

When the essential SOP Class is rejected, the third response analyzing part 105 outputs the essential SOP Class and the inconsistency information to the countermeasure acquisition part 108.

Such inconsistency information is information regarding the Meta SOP Class corresponding to the relevant essential SOP Class. In this case, the countermeasure acquisition part 108 acquires the countermeasure. The countermeasure acquisition part 108 also outputs, to the display controller 109, the countermeasure and information that the rejected essential SOP Class and the Meta SOP Class corresponding to the relevant essential SOP Class cannot be used. For example, when the "Basic Film Box SOP Class" is rejected, the Print service cannot be used. This is because both "Basic Grayscale Meta" and "Basic Color Meta" cannot be used. As another example, when the "Basic Color Image Box Class" is rejected, "Basic Color Meta" cannot be used.

As described above, the medical-information communication-connection management device according to the present embodiment automatically extracts problems in network communication and problems in DICOM communication. In addition, the medical-information communication-connection management device is constructed to provide a countermeasure corresponding to the extracted problem. This composition allows the operator to immediately acquire the countermeasure for the problem that has occurred in the network connection and easily execute a response to the failure. In addition, the medical-information communication-connection management device according to the present embodiment extracts inconsistent connection conditions by comparing the connection conditions for the management device and the connection conditions for the communication destination. Furthermore, the medical-information communication-connection management device is constructed to also provide a countermeasure for the relevant inconsistent conditions. This allows for recognizing the relationship between the connection conditions for the communication sender and those for the communication destination, thereby facilitating the specification of the cause of the problem.

Second Embodiment

Next, the medical-information communication-connection management device according to the second embodiment of this invention will be described. The medical-information communication-connection management device according to the second embodiment is different from the first embodiment in the following respects. Specifically, the medical-information communication-connection management device according to the present embodiment is constructed to execute a connection request using all of the combinations of Abstract Syntaxes and Transfer Syntaxes that can be used by the management device and determine whether the connection required during response analysis is possible. Next, the sending and analyzing of the connection request will be mainly described below. FIG. 1 is a block diagram that represents the functions of the medical-information communication-connection management device according to the present embodiment. In the following description, functional parts with symbols identical to those in the first embodiment are considered to have the same functions unless specified otherwise.

The request sending part 101 first sends a connection request through the network communication between the medical information device 010 and the management device to the network communication net including the medical information device 010 and the network 001. Then, when receiving response data that the connection request through the network communication has been accepted from the medical information device 010 to the response-data receiving part 102, the network communication is established between the medical-information communication-connection management device 100 and the medical information device 010.

The request sending part 101 preliminarily stores, in the management device storage area, combinations of Abstract Syntaxes and Transfer Syntaxes that can be used by the management device as setting files. These combinations are stored based on the types of services. The "self" referred to herein is the medical-information communication-connection management device 100. The request sending part 101 receives information regarding the type of service executing the connection request, the information having been input by the operator through the input part 111. Then, the request sending part 101 generates a connection request based on the input type of service. The relevant connection request is included in the input type of service and is for executing a connection with the combinations of all of the Abstract Syntaxes and Transfer Syntaxes that can be used by the management device.

That is, in the present embodiment, without using a combination of an Abstract Syntax and Transfer Syntax that is input by the operator, a connection request is generated with combinations of all of the available Abstract Syntaxes and Transfer Syntaxes. For example, when the operator inputs an instruction to execute a connection request using the Storage service, the request sending part 101 creates a table for executing the connection request. This table is for executing the connection request in the Storage service with the combinations of all of the Abstract Syntaxes and Transfer Syntaxes that can be used by the management device. Then, the request sending part 101 executes a connection request based on this table.

When the relevant network communication has been established, the request sending part 101 sends a connection request with the medical information device 010 through the DICOM communication to the medical information device 010. This connection request is created by the request sending part 101. For example, the request sending part 101 refers to the table created by the management device. As a result of the reference, the request sending part 101 sends a connection request based on the items set in the relevant table.

The third response analyzing part 105 receives, from the response-data receiving part 102, an input of response data indicating that the response was successful through the DICOM communication.

The relevant response data includes combinations of accepted Abstract Syntaxes and Transfer Syntaxes as well as combinations of rejected Abstract Syntaxes and Transfer Syntaxes.

Furthermore, the third response analyzing part 105 receives information regarding the combination of an Abstract Syntax and Transfer Syntax to be used according to the operator's input. Such information is received, for example, when the operator inputs the type of service and when information according to the relevant input is received by the request sending part 101.

The third response analyzing part 105 extracts, from the input response data, combinations of accepted Abstract Syntaxes and Transfer Syntaxes as well as combinations of rejected Abstract Syntaxes and Transfer Syntaxes. The third response analyzing part 105 compares each of the extracted combinations with the input combination. The extracted combinations refer to the combinations of accepted Abstract Syntaxes and Transfer Syntaxes as well as the combinations of rejected Abstract Syntaxes and Transfer Syntaxes. The input combination refers to the combination of an Abstract Syntax and Transfer Syntax to be used.

Then, the third response analyzing part 105 determines that among the relevant rejected combinations, those that are not included in the combination input by the operator are not used and that there is no problem with the current communication. As a result, the third response analyzing part 105 does not create inconsistency information.

On the other hand, the third response analyzing part 105 outputs, from among the rejected combinations, those consistent with the input combination to the countermeasure acquisition part 108 as inconsistency information. As such, by ignoring the combinations of Abstract Syntaxes and Transfer Syntaxes not to be used, a countermeasure is not displayed even if the connection request based on the relevant unused combination is rejected, which allows for deleting information unnecessary for the operator.

A specific example of the actions of the request sending part 101 and the third response analyzing part 105 of the present embodiment will be now described. As an example, we will describe cases in which the operator has selected the Storage service class and the medical-information communication-connection management device 100 supports only a combination in which the Abstract Syntax=CT Image and the Transfer Syntax=JPEG.

The request sending part 101 executes a connection request for the medical information device 010 using only all of the combinations of Abstract Syntaxes and Transfer Syntaxes available in the Storage service class. In this example, a combination in which the Abstract Syntax=CT Image and the Transfer Syntax=JPEG is employed.

First, when the response is accepted to this connection request, it is possible to execute communication with the medical information device 010 without problems. That is, a countermeasure is not displayed by the medical-information communication-connection management device 100.

Next, when the response for this connection request is rejected, the actions of the third response analyzing part 105 are different from those described in the first embodiment. That is, the actions of the third response analyzing part 105 differ depending on the details of all of the combinations of Abstract Syntaxes and Transfer Syntaxes to be used by the operator according to the input.

First, when the combination in which the Abstract Syntax=CT Image and the Transfer Syntax=JPEG has not been designated for use by the operator, the third response analyzing part 105 determines that there is no problem because this combination will not be used. That is, the countermeasure is not displayed.

On the other hand, when the combination in which the Abstract Syntax=CT Image and the Transfer Syntax=JPEG has been designated for use by the operator, the third response analyzing part 105 outputs the inconsistency information to the countermeasure acquisition part 108. That is, the countermeasure is displayed.

Moreover, in the present embodiment, as described in the first embodiment, there are differences by service classes in the actions of the request sending part 101, the third response analyzing part 105, and the countermeasure acquisition part 108. In the present embodiment, each functional part (i.e., the request sending part 101 and the third response analyzing part 105) performs the following actions by service class. The request sending part 101 executes a connection request based on all of the combinations of Abstract Syntaxes and Transfer Syntaxes that can be used by the management device. After this connection request, the third response analyzing part 105 determines whether the combinations of rejected Abstract Syntaxes and Transfer Syntaxes correspond to the combination of an Abstract Syntax and Transfer Syntax according to the operator's input. Actions other than sending of the relevant connection request and determination of the relevant combination are similar to those described in the first embodiment.

As described above, the medical-information communication-connection management device according to the present embodiment executes a connection request with combinations of all of the supported Abstract Syntaxes and Transfer Syntaxes. The device is constructed to determine whether or not to use after this connection request. Even with such a construction, it is possible for the operator to immediately acquire the countermeasure for a problem occurring in the network connection, which allows for easily responding to a failure.

Furthermore, it is possible to recognize the relationship between the connection conditions for the communication sender and those for the communication destination, which allows for easily specifying the cause of the problem.

Third Embodiment

Figure 8:
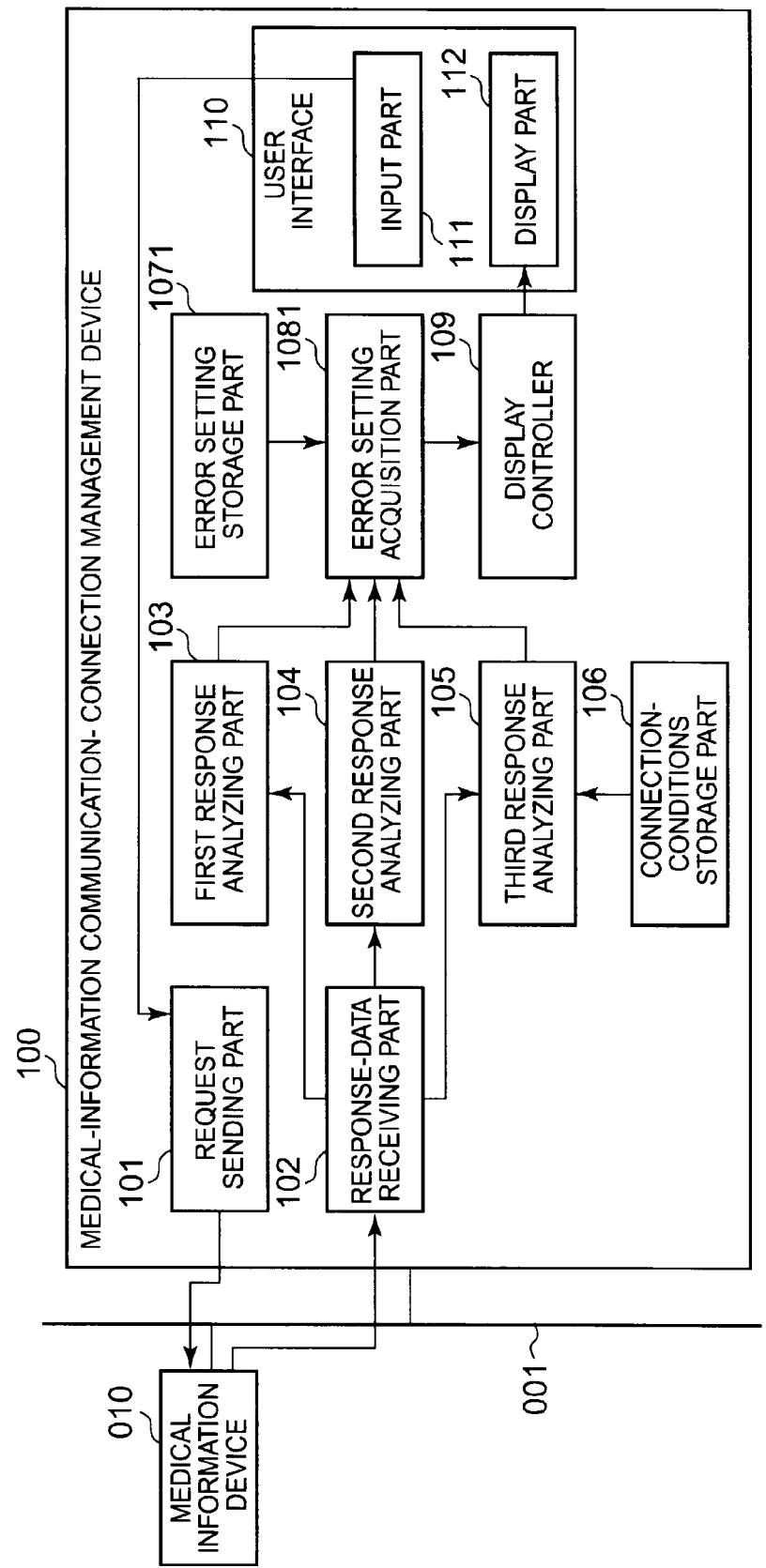
FIG. 8 is a block diagram of a structural outline of a medical image processing system according to the fourth embodiment of this invention.

Next, with reference to FIG. 8, the medical-information communication-connection management device according to the third embodiment of the present invention will be described. FIG. 8 is a block diagram of the medical-information communication-connection management device 100 according to the third embodiment of the present invention. Similar to the second embodiment, the medical-information communication-connection management device 100 according to the third embodiment of the present invention is constructed to execute a connection request with all of the combinations of Abstract Syntaxes and Transfer Syntaxes that can be used by the management device and determine whether the connection required for analyzing the response is possible. That is, based on the SOP class input by the operator (i.e., the type of service in the Abstract Syntax), all of the combinations of Abstract Syntaxes and Transfer Syntaxes that can be used by the management device are extracted. In addition, the request sending part 101 generates a connection request based on this combination.

In addition, processes by which the response-data receiving part 102 receives the response data for the connection request and processes by which the first response analyzing part 103, the second response analyzing part 104, and the third response analyzing part 105 each analyze the relevant received response data are similar to those described in the second embodiment.

However, the medical-information communication-connection management device 100 according to the third embodiment is different from the second embodiment in the following respects. First of all, in the third embodiment, the medical-information communication-connection management device 100 has an errant-setting storage part 1071 instead of the countermeasure storage part 107. This errant-setting storage part 1071 stores various error information matched with information indicating settings errors that cause such errors. For example, the errant-setting storage part 1071 stores the error information included in the application error log through the network communication matched with the information that indicates the settings error that causes the relevant error information. Another example stores a parameter that indicates the reason for a failure included in the response data when the response has failed through the DICOM communication, the parameter matched with the information that indicates the settings error that causes the failed response through the relevant DICOM communication. In yet another example, the errant-setting storage part 1071 stores combinations of Abstract Syntaxes and Transfer Syntaxes that are inconsistent between the communication devices, each combination matched with the information that indicates the settings error in the relevant combination.

Such information in the errant-setting storage part 1071 may be stored in a format such as a table. Alternatively, the errant-setting storage part 1071 may store a program that describes outputting information corresponding to the relevant condition (i.e., information that indicates the settings error) when a certain condition is entered.

This program can be referred to as a "dictionary." For example, the errant-setting storage part 1071 may store a correspondence table as shown in the example of FIG. 3 for the first embodiment. However, the correspondence table of the present embodiment is different in the following respects. That is, the errant-setting storage part 1071 is different from the countermeasure storage part 107 in the first embodiment and the second embodiment not in terms of the countermeasures but in the respect that the information indicating the settings error that causes the error information is matched with the error information.

Furthermore, the medical-information communication-connection management device 100 according to the third embodiment has an errant-setting acquisition part 1081. When acquiring information regarding the application error log from the first response analyzing part 103, this errant-setting acquisition part 1081 refers to the errant-setting storage part 1071 based on the relevant information, similar to the countermeasure acquisition part 108 according to the second embodiment. As a result of the reference, the errant-setting acquisition part 1081 acquires information that indicates the settings error that corresponds to information regarding the application error log and is the cause of the relevant error. Then, the errant-setting acquisition part 1081 outputs the acquired information regarding the settings error to the display controller 109.

In addition, when the response has failed through the DICOM communication after the network communication has been established, the errant-setting acquisition part 1081 receives an input of the parameter that indicates the reason for the failure from the second response analyzing part 104. The errant-setting acquisition part 1081 refers to the errant-setting storage part 1071 based on the input parameter. As a result of this reference, the errant-setting acquisition part 1081 acquires information that indicates the settings error that corresponds to the relevant parameter and is the cause of the relevant failed response. Then, the errant-setting acquisition part 1081 outputs the acquired information regarding the countermeasure to the display controller 109.

In addition, when the network communication has been established and the response through the DICOM communication has been successfully executed, and when the combinations of Abstract Syntaxes and Transfer Syntaxes are inconsistent between the communication devices, the errant-setting acquisition part 1081 receives an input of the inconsistency information from the third response analyzing part 105. When some of the Transfer Syntaxes are rejected for a specific Abstract Syntax, the errant-setting acquisition part 1081 makes a determination in a manner similar to that described in the second embodiment. That is, the errant-setting acquisition part 1081 is basically capable of using the corresponding service for the object included in the relevant specific Abstract Syntax, and it is determined that the service with the rejected Transfer Syntax cannot be used.

When receiving an input of inconsistency information from the third response analyzing part 105, the errant-setting acquisition part 1081 refers to the errant-setting storage part 1071. As a result of the reference, the errant-setting acquisition part 1081 acquires information that indicates the settings error in the rejected Transfer Syntax based on the inconsistency information. In addition, when all of the Transfer Syntaxes in the specific Abstract Syntax are rejected, the errant-setting acquisition part 1081 determines that the types of services included in the relevant Abstract Syntax cannot be used. Then, the errant-setting acquisition part 1081 outputs information that indicates the acquired settings error or the relevant determination results to the display controller 109.

Furthermore, the medical-information communication-connection management device 100 according to the third embodiment has a screen storage part that stores screen data of the settings screen for creating a connection request. Illustrations related to this screen storage part have been omitted. When the display controller 109 receives information that indicates the settings error from the errant-setting acquisition part 1081, it first reads out the screen data of the settings screen from the screen storage part. Furthermore, the display controller 109 analyzes information received from the errant-setting acquisition part 1081. That is, the display controller 109 specifies the settings item according to the relevant settings error based on the information that indicates the settings error. In addition, the display controller 109 displays this specified settings item differentiated from other parts in the relevant screen data.

For example, when a settings item according to the settings error cannot be input in a text box on the settings screen, the display controller 109 performs a process so that the relevant text box in the relevant screen is displayed in a different color from other parts or performs a process so that the text box is reversed and displayed.

Alternatively, the display controller 109 executes a display process, such as causing the relevant text box part to blink or encircling the text box with a bold frame.

Other examples of the processes performed by the display controller 109 include the following. For example, when the settings item according to the settings error is selectable using a checkbox on the settings screen, the display controller 109 executes a process to render the relevant checkbox on the relevant screen unselectable.

The display controller 109 executes processes for the settings screen as described above based on the input from the errant-setting acquisition part 1081 and further causes the display part 112 to display the settings screen after the processes. The processes of changing the settings screen operated by the display controller 109 may be executed by other functional parts, such as the errant-setting acquisition part 1081. In this case, the display controller 109 only receives screen data of the settings screen after the display processing and causes the display part 112 to display the screen.

According to such a construction, the operator may confirm the settings error through the DICOM communication on the settings screen displayed on the display part 112, which allows for visually recognizing the location in which the problem has occurred. Therefore, this allows for the operator to more directly understand the problem that has occurred. Furthermore, it becomes possible to immediately and easily resolve the problem that has occurred.

In the third embodiment, instead of the countermeasure storage part 107, the errant-setting storage part 1071 is installed, and furthermore, instead of the countermeasure acquisition part 108, the errant-setting acquisition part 1081 is provided. However, it is not necessary to limit the present invention to this construction; for example, the countermeasure storage part 107, the errant-setting storage part 1071, the countermeasure acquisition part 108, and the errant-setting acquisition part 1081 may all be provided. In this construction, the display controller 109 may be capable of switching the display of the countermeasure and the display of the settings screen after the processes.

In addition, the errant-setting acquisition part 1081 of the third embodiment may count the number of read-outs of information regarding settings errors by error information whenever referring to the errant-setting storage part 1071. In this construction, information regarding the errant-setting storage part 1071 is rewritten so that information with higher counts should be listed at an earlier order.

That is, for information with a higher hit rate, the order of listing the information regarding the settings error is automatically adjusted so that the errant-setting acquisition part 1081 can immediately refer to the information.

Fourth Embodiment

Next, the medical-information communication-connection management device according to the fourth embodiment of the present invention will be described. In the third embodiment, the errant-setting storage part 1071 preliminarily stores past errors matched with information that indicates the settings errors. However, due to alterations of the network, alterations of DICOM, increases in new communication destinations, etc., unknown errors that are not stored in the medical-information communication-connection management device 100 may occur. An unknown error in this medical-information communication-connection management device 100 is hereinafter referred to simply as an "unknown error."

In response to such cases, the medical-information communication-connection management device 100 according to the fourth embodiment preliminarily stores example settings that were successful in the past in terms of the network, DICOM, and connection conditions. The example settings that were successful in the past are hereinafter referred to simply as "successful examples." In addition, the medical-information communication-connection management device 100 according to the fourth embodiment attempts to generate a connection request and send it to the communication destination based on the settings according to the successful examples. Only the parts characteristic of the fourth embodiment will be described below.

The medical-information communication-connection management device 100 has a successful-example storage part that stores successful examples. Illustrations of this successful-example storage part are omitted. This successful-example storage part matches and stores combinations of successful and proven Abstract Syntaxes and Transfer Syntaxes from the past for each of Abstract Syntaxes.

The errant-setting acquisition part 1081 refers to the errant-setting storage part 1071 based on the error information, etc. received from the first response analyzing part 103, the second response analyzing part 104, and the third response analyzing part 105.

However, in some cases, the error information received by the errant-setting acquisition part 1081 is an unknown error. An unknown error refers to an error that is not stored in the errant-setting storage part 1071. In this case, the errant-setting acquisition part 1081 cannot find the corresponding error information even by referring to the errant-setting storage part 1071. Then, the errant-setting acquisition part 1081 reads out corresponding successful examples from the successful-example storage part based on the SOP classes input by the operator, that is, the types of services in the Abstract Syntax. That is, the errant-setting acquisition part 1081 reads out, for each of Abstract Syntaxes, successful and proven combinations of Abstract Syntaxes and Transfer Syntaxes in the past. The errant-setting acquisition part 1081 sequentially sends the read-out successful examples in the order in which they were read out to the request sending part 101.

The request sending part 101 generates a connection request based on the relevant combinations every time a combination of an Abstract Syntax and Transfer Syntax is received from the errant-setting acquisition part 1081. That is, according to the past successful examples corresponding to the types of services in the Abstract Syntax input by the operator, connection requests are generated in series.

Furthermore, the request sending part 101 sends the generated connection requests sequentially to the set communication destination.

The response-data receiving part 102 receives a response to the generated connection request according to a successful example from the communication destination. That is, it receives response data from the medical information device 010 that is the communication destination. Furthermore, the first response analyzing part 103, the second response analyzing part 104, and the third response analyzing part 105 each analyze the relevant received response data.

The display controller 109 receives the analysis results and compares, for example, the settings for each of the connection conditions for each successful example with the settings for each of the connection conditions according to the input by the operator. As a result of the comparison, the display controller 109 causes the display part 112 to display the difference in the settings. In this case, the display controller causes the display part 112 to display, together with the difference, the analysis results, that is the result indicating a failed connection or a successful connection and results indicating consistency or inconsistency in the results of connection conditions between the communication devices. The display controller 109 may be constructed to conduct comparisons with only the successful connections and display the differences.

According to the fourth embodiment, when an unknown error has occurred in the communication with the medical information device 010, a connection request is generated and sent according to the past successful examples. Furthermore, the display controller 109 compares the connection request according to the past successful examples with the connection request according to the unknown error and displays the differences. In addition, the display controller 109 also displays the analysis results of the response data for the connection request.

Accordingly, in the response data for the connection request, even when an unknown error that is not stored in the errant-setting storage part 1071 of the medical-information communication-connection management device 100 is included, it is possible to determine the problem with the connection request according to the unknown error.

According to such a construction, the operator is able to respond to a wider range of errors by determining the problem in the connection request according to the unknown error, which allows for specifying the causes of problems across a wider range.

The processes that are related to the comparisons with the successful examples and are performed by the display controller 109 may be executed by other functional parts, such as the errant-setting acquisition part 1081. In this case, the display controller 109 only receives information regarding the differences and analysis results and causes the display part 112 to display this information.

In addition, the fourth embodiment assumes the construction of the third embodiment; however, it is also possible to apply the construction of the first embodiment or the second embodiment. That is, as a result of response analysis, in some cases, error information, etc. that is not included in the error information corresponding to the countermeasures stored in the countermeasure storage part 107 is displayed. In this case, it is difficult for the countermeasure acquisition part 108 to acquire a valid countermeasure. The construction of the fourth embodiment is thus applied to the first embodiment or the second embodiment to generate and attempt to send a connection request based on the past successful examples. The subsequent processes are as described above.

What is claimed is:

1. A medical-information communication-connection management device comprising:
   a request sending part configured to send a first connection request through network communication and a second connection request through DICOM communication executed after establishment of said network communication to a medical information device that is a communication destination through a communication network that includes the medical information device that is the communication destination;
   a response-data receiving part configured to receive first response data for the first connection request and second response data for the second connection request;
   a first response analyzing part configured to acquire first error information from the first response data, which indicates an error in the network communication, when the received first response data is data indicating a failed connection;
   a second response analyzing part configured to acquire second error information from the second response data, which indicates an error in said DICOM communication after successful establishment of the network communication, when the received second response data is data indicating a failed connection;
   a countermeasure storage part configured to store first countermeasures for error information in said network communication and second countermeasures for error information in said DICOM communication;
   a countermeasure acquisition part configured to access the countermeasure storage part to extract one of the first countermeasures responsive to the first error information and one of the second countermeasures responsive to the second error information; and
   a display controller configured to cause a display to display the extracted countermeasure,
   wherein said countermeasure displayed on said display comprises error identification information, identification information of the medical information device, information on which of the communication sender or the communication destination fails, and information on whether changing connection conditions is effective for recovery.

2. The medical-information communication-connection management device according to claim 1, further comprising:
   a connection-conditions storage part configured to preliminarily store connection conditions for DICOM communication; and
   a third response analyzing part configured to execute the following steps when the received second response data is data indicating a successful connection: extracting the connection conditions of the medical information device based on the second response data; comparing the connection conditions of the medical information device with the connection conditions stored in said connection-conditions storage part; and acquiring inconsistency information as information regarding inconsistent connection conditions, wherein
   the countermeasure storage part is configured to further store third countermeasures for inconsistencies in connection conditions to said communication destination,
   the countermeasure acquisition part is configured to extract a countermeasure based on said inconsistency information, and
   the display controller is configured to cause the display to display the countermeasure for said extracted inconsistency information.

3. The medical-information communication-connection management device according to claim 2, wherein connection conditions for said DICOM communication include a combination of types of services to be used by said medical information device during DICOM communication and types of data to be subject to the services.

4. The medical-information communication-connection management device according to claim 2, wherein the third response analyzing part is configured to determine the connection conditions of the medical information device based on acceptance and rejection information included in the second response data as a response from the medical information device.

5. The medical-information communication-connection management device according to claim 1, wherein the request sending part is configured to create said second connection request including a combination of designated types of services to be used by the communication destination during DICOM communication and types of data to be subject to the services.

6. A medical-information communication-connection management device that implements DICOM communication through network communication to a medical information device that is the communication destination, comprising:
   a display configured to display a settings screen for setting the communication destination, a combination of types of services to be used during said DICOM communication and types of data to be subject to the services, and a method for constructing data to be used;
   a request sending part configured to send a first connection request for said network communication and a second connection request for said DICOM communication, executed after establishment of the network communication, to a communication network that includes the medical information device, based on said communication destination and said combination set in the settings screen;
   a response-data receiving part configured to receive first response data for the first connection request and second response data for the second connection request;
   a connection-conditions storage part configured to preliminarily store connection conditions for DICOM communication;
   a first response analyzing part configured to acquire first error information from the first response data, which indicates an error in the network communication, when the received first response data is data indicating a failed connection;
   a second response analyzing part configured to acquire second error information from the second response data, which indicates an error in said DICOM communication after successful establishment of the network communication, when the received second response data is data indicating a failed connection;
   a third response analyzing part configured to execute the following steps when the received second response data is data indicating a successful connection: extracting the connection conditions of the medical information device based on the second response data; comparing the connection conditions of the medical information device with the connection conditions stored in said connection-conditions storage part; and acquiring inconsistency information as information regarding inconsistent connection conditions;

an error-setting storage part configured to preliminarily store information indicating communication setting errors for said network communication, said DICOM communication, or each inconsistency in connection conditions to said communication destination;

an error-setting acquisition part configured to refer to said error-setting storage part based on at least one of said first error information, said second error information, and said inconsistency information so as to extract information indicating error in the communication settings;

a display controller configured to cause an error portion to be displayed on the settings screen as distinguished from other parts based on the extracted information indicating the error in the communication settings; and a successful-case storage part configured to store connection-related information of said first connection request and said second connection request implemented in the past for said medical information device, wherein when said error-setting acquisition part fails to extract information indicating the error in said communication settings, said request sending part is configured to access said connection-related information and to send said first connection request and said second connection request based on said connection-related information, said response-data receiving part is configured to receive said first response data based on said connection-related information and said second response data based on said connection-related information, said display controller is configured to compare cases of successful connection in said first response data based on said connection-related information and cases of successful connection in said second response data based on said connection-related information with a first connection request and a second connection request set in said settings screen and to cause the differences to be displayed on the display screen.

7. The medical-information communication-connection management device according to claim 6, wherein said second connection request includes a combination of types of services designated to be used by the communication sender during said DICOM communication and types of data to be subject to the services.

8. The medical-information communication-connection management device according to claim 6, wherein said display executed by said display controller comprises at least one of either emphasizing and displaying said part in error or making the error portion unselectable.

9. The medical-information communication-connection management device according to claim 6, wherein the request sending part is configured to send, along with the accessed connection-related information, said first connection request and said second connection request based on said communication destination that has been set.

10. A method for managing connections for communicating medical information using a medical-information communication-connection management device, the device including a connection-conditions storage part configured to preliminarily store connection conditions for DICOM communication; and a countermeasures storage part configured to store first countermeasures for information regarding errors in network communication, second countermeasures for information regarding errors in said DICOM communication, and third countermeasures for inconsistencies in connection conditions to a medical information device that is a communication destination, the method comprising:

sending a first connection request for said network communication from a request sending part to the medical information device that is said communication destination;

receiving first response data for said first connection request through a response-data receiving part;

acquiring, when first response data received through said response-data receiving part is data indicating a failed connection, first error information from the first response data by analyzing an error in said network communication using a first response analyzing part;

sending, after establishing a connection through said network communication, a second connection request through said DICOM communication to the medical information device through said request sending part;

receiving second response data for said second connection request through said response-data receiving part;

acquiring, when said second response data received through said response-data receiving part is data indicating a failed connection, second error information from said second response data using a second response analyzing part configured to analyze an error in said DICOM communication;

extracting, when said second response data received through said response data-receiving part is data indicating a successful connection, connection conditions of the medical information device based on the second response data using a third response analyzing part that is configured to compare the connection conditions of the medical information device with the connection conditions stored in said connection-conditions storage part, and to acquire inconsistency information as information regarding inconsistent connection conditions;

accessing, using a countermeasures acquisition part, information stored in said countermeasures storage part based on said first error information, said second error information, and said inconsistency information to extract at least one countermeasure; and displaying said extracted at least one countermeasure on a display using a display controller.

* * * * *